UNITED STATES PATENT OFFICE.

ARTHUR W. SMITH, OF SIOUX CITY, IOWA, ASSIGNOR OF ONE-HALF TO ALICE T. BOND, OF SAME PLACE.

PLASTERING COMPOUND.

SPECIFICATION forming part of Letters Patent No. 528,995, dated November 13, 1894.

Application filed July 14, 1894. Serial No. 517,563. (No specimens.)

*To all whom it may concern:*

Be it known that I, ARTHUR W. SMITH, a citizen of the United States, residing at Sioux City, in the county of Woodbury and State of Iowa, have invented certain new and useful Improvements in Plastering Compounds; and I do hereby declare that the following is a full, clear, and exact description of the same.

The present invention has for its object to provide a powerful stucco retarding compound that will possess both strength and durability and the necessary chemical properties for delaying the setting of stucco-mortar until the same can be readily and successfully worked.

The invention consists in a stucco retarding compound and the process or method of producing the same, as will be hereinafter described and claimed.

It is known that stucco when mixed alone for use commences at once to harden before it can be worked and to remove this difficulty I prepare a compound that will successfully check this hardening and thereby give the workman a sufficient time to dress and finish the wall before the hardening commences.

The ingredients from which the compound is produced are as follows: glue—lime—wheat flour—tartaric acid.

In producing this compound I take one barrel of unslaked lime (about two hundred pounds) and add thereto about one hundred pounds of glue and thoroughly mix them together, after which is added a sufficient amount of water (about one barrel) to thoroughly slake all the lime. During this slaking of the lime, and while the mixture is hot, it is kept stirred so that the glue may come into intimate contact with the boiling lime, thereby forming not merely a mechanical mixture, but a true chemical compound. About fifty pounds of wheat-flour and about the same quantity of tartaric-acid are added to complete the compound which may be called a "calcined glue" and when cooling appears as a thick yellowish, gray-colored compound, resembling in appearance thin fresh putty. This is my improved compound and is now ready for use.

The compound is readily soluble in water and can be added to the stucco when in a moist state or it may be baked or dried perfectly and ground fine and then added to and thoroughly mixed with the stucco in the dry form before adding any water. It is a most powerful retarder, as one half pound of this ground calcined glue will be sufficient to hold in soluble form one hundred pounds of stucco until the same can be easily worked and the wall finished.

Having now fully described my invention, what I claim as new, and desire to secure by Letters Patent, is—

1. The process herein described of producing a stucco retarding compound, consisting in mixing in a dry state unslaked lime and glue, and afterward adding a sufficient amount of water to thoroughly slake all the lime while mixed with the glue, and while the mixture is hot thoroughly stir the same so that the glue may come into intimate contact with the boiling lime, and add to the mixture wheat flour and tartaric-acid, substantially as and for the purpose set forth.

2. A stucco retarding compound, consisting of lime, glue, wheat flour, and tartaric-acid, in substantially the proportions named.

In testimony that I claim the above I have hereunto subscribed my name in the presence of two witnesses.

ARTHUR W. SMITH.

Witnesses:
C. A. BOND,
J. W. SHAW.